United States Patent [19]
Anger

[11] 3,979,594
[45] Sept. 7, 1976

[54] TOMOGRAPHIC GAMMA RAY APPARATUS AND METHOD

[76] Inventor: Hal O. Anger, 1771 Highland Place, Berkeley, Calif. 94709

[22] Filed: Mar. 23, 1972

[21] Appl. No.: 237,521

Related U.S. Application Data

[63] Continuation of Ser. No. 794,327, Jan. 27, 1969, which is a continuation-in-part of Ser. No. 646,804, June 15, 1967, abandoned.

[52] U.S. Cl............................ 250/369; 250/363 S; 250/445 T
[51] Int. Cl.............................................. G01t 1/16
[58] Field of Search......... 250/366, 369, 363, 44 ST

[56] References Cited

UNITED STATES PATENTS

| | | | |
|---|---|---|---|
| 3,011,057 | 8/1961 | Anger | 250/367 |
| 3,209,201 | 9/1965 | Anger | 250/367 |
| 3,320,418 | 5/1967 | Steel | 250/366 |
| 3,418,471 | 12/1968 | Gydesen | 250/369 |
| 3,499,146 | 3/1970 | Richards | 250/323 |
| 3,502,873 | 3/1970 | Woronowicz | 250/366 |
| 3,509,341 | 4/1970 | Hindel et al. | 250/366 |
| 3,573,458 | 4/1971 | Anger | 250/369 |
| 3,612,865 | 10/1971 | Walker | 250/366 |

OTHER PUBLICATIONS

"Tomographic Gamma-Ray Scanner–" by Anger, UCRL 16899, May 31, 1966.

Image Separation Radioisotope Scanning by Kuhl et al., Radiology, vol. 80, No. 4, pp. 653–662, Apr. 1963.

*Primary Examiner*—Harold A. Dixon

[57] ABSTRACT

This invention provides a radiation detecting apparatus for imaging the distribution of radioactive substances in a three-dimensional subject such as a medical patient. Radiating substances introduced into the subject are viewed by a radiation image detector that provides an image of the distribution of radiating sources within its field of view. By viewing the area of interest from two or more positions, as by scanning the detector over the area, the radiating sources seen by the detector have relative positions that are a function of their depth in the subject. The images seen by the detector are transformed into first output signals which are combined in a readout device with second output signals that indicate the position of the detector relative to the subject. The readout device adjusts the signals and provides multiple radiation distribution readouts of the subject, each readout comprising a sharply resolved picture that shows the distribution and intensity of radiating sources lying in a selected plane in the subject, while sources lying on other planes are blurred in that particular readout.

53 Claims, 25 Drawing Figures

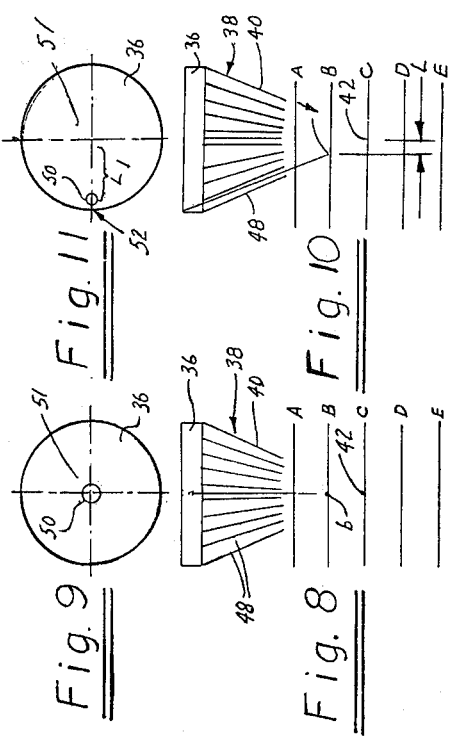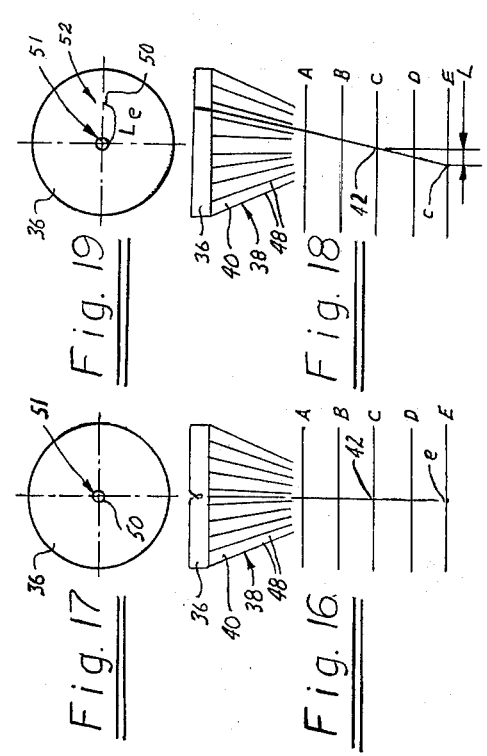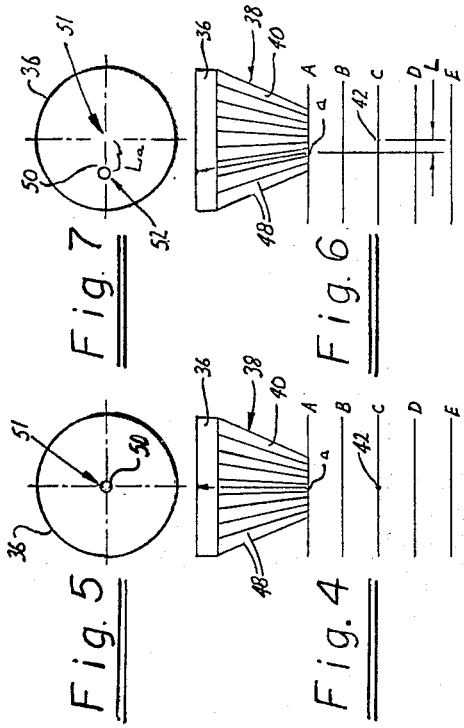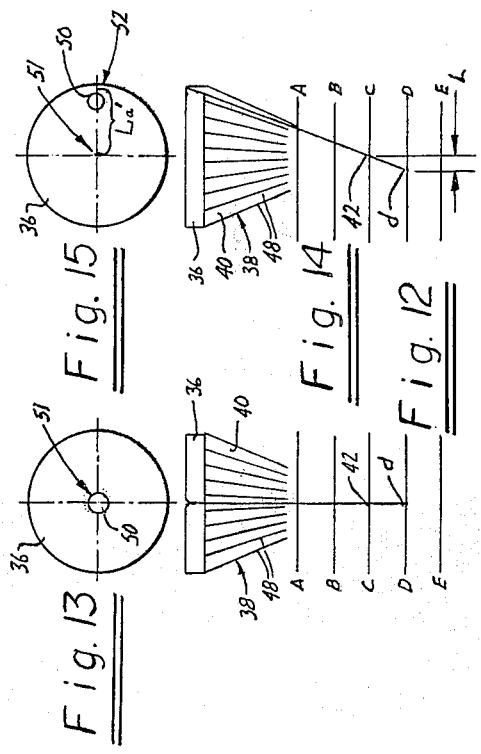

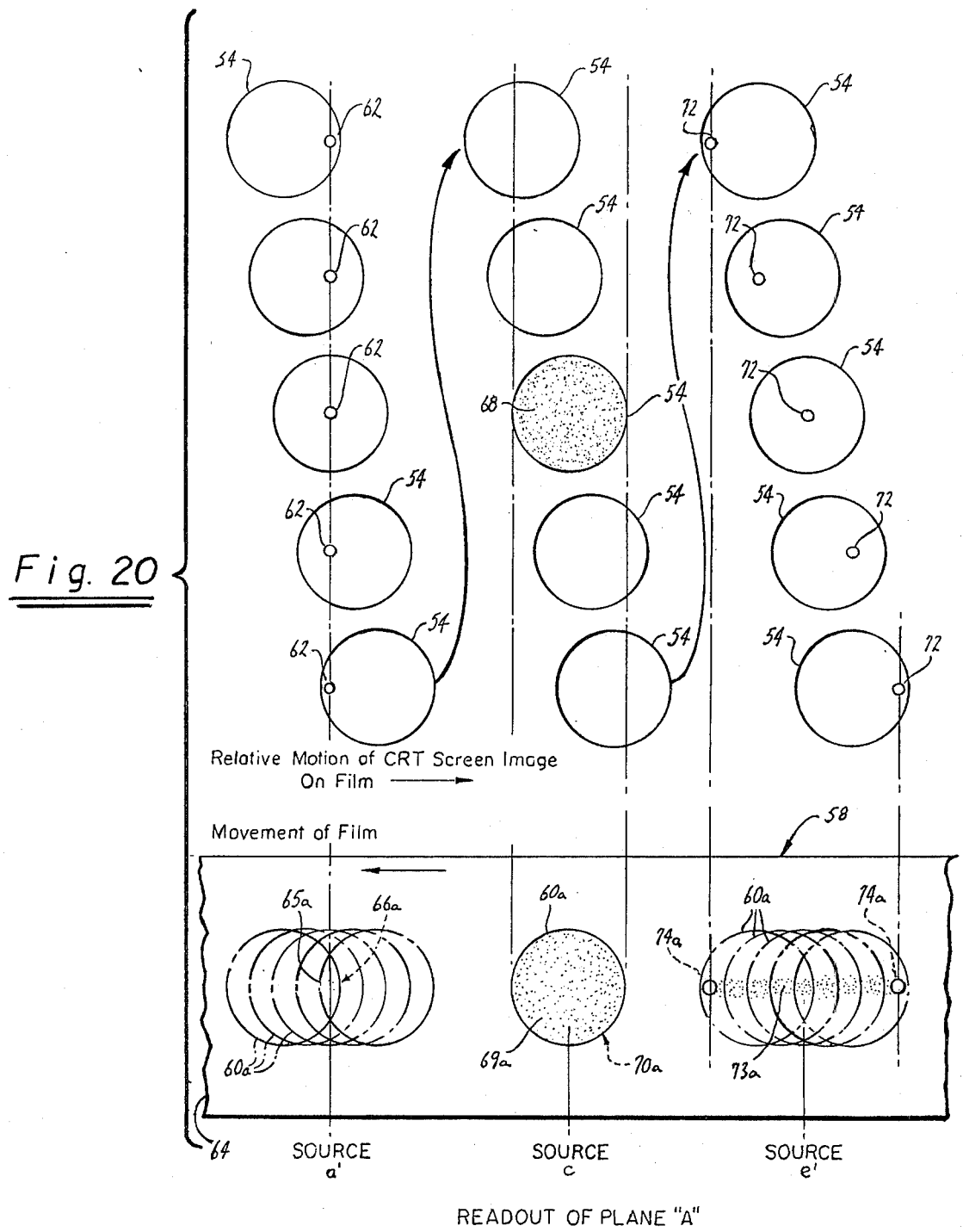

Relative Motion of CRT Screen Image On Film ⟶

Movement of Film

READOUT OF PLANE "E"

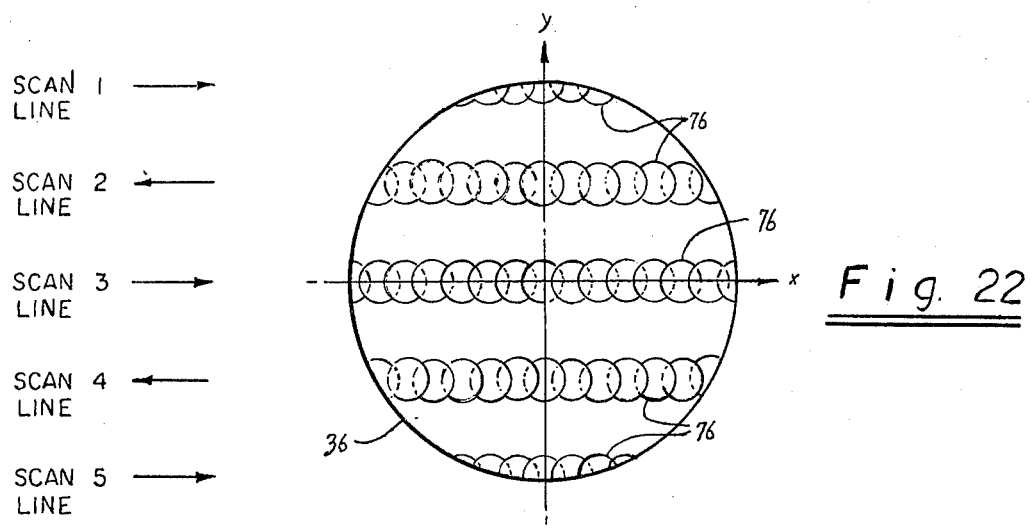
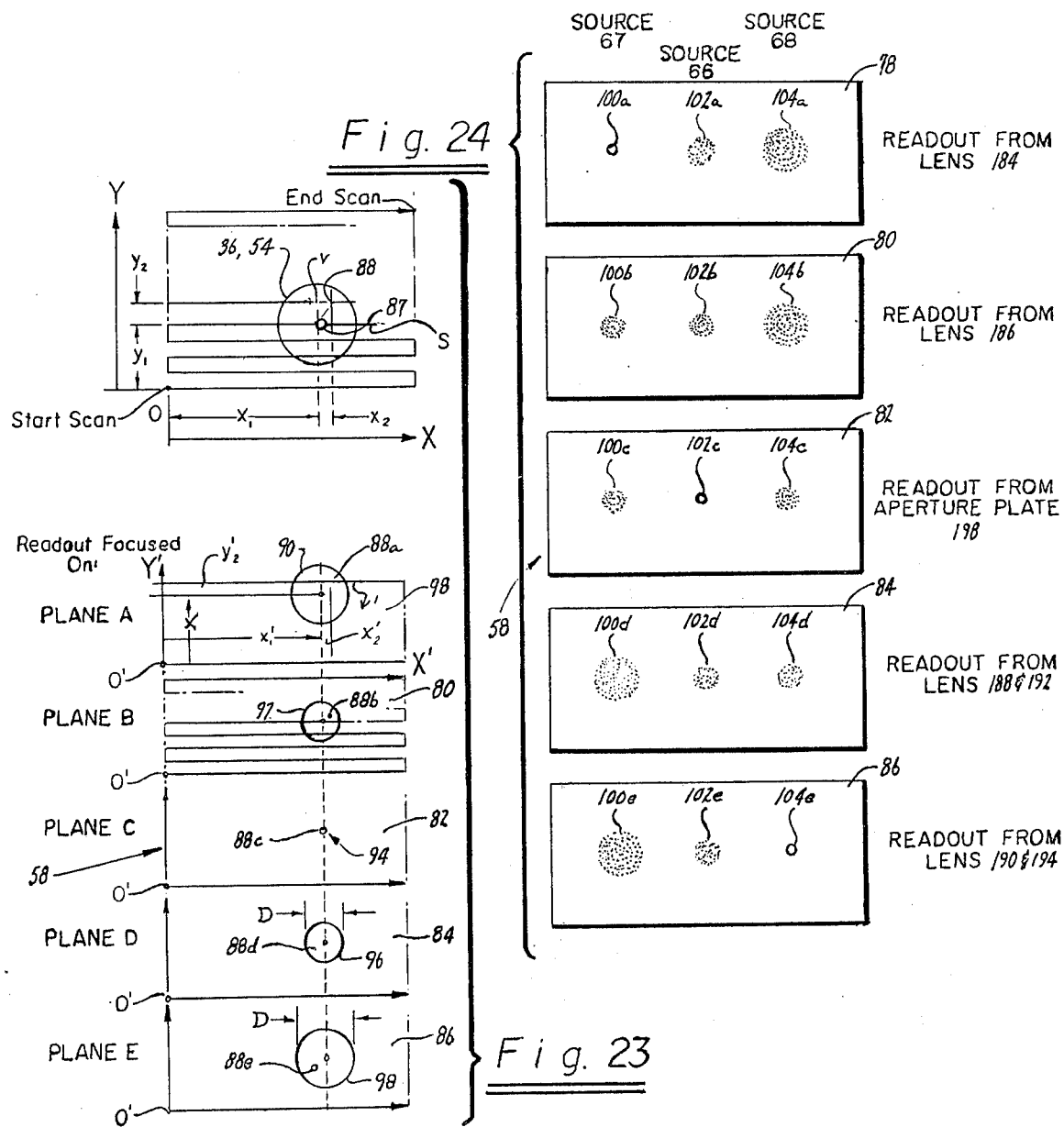

TOMOGRAPHIC GAMMA RAY APPARATUS AND METHOD

The invention was made in the course of or under Contract W-7405-ENG-48 with the Atomic Energy Commission of the United States of America.

This application is a continuation of Ser. No. 794,327 filed Jan. 27, 1969 which is a continuation-in-part of application Ser. No. 646,804 filed June 15, 1967 for TOMOGRAPHIC GAMMA-RAY SCANNER WITH SIMULTANEOUS READOUT OF SEVERAL PLANES and now abandoned.

The invention relates to apparatus for imaging the distribution of radioactive sources in a subject.

It is common to introduce radioactive substances into subjects, such as medical patients, to trace the flow or the radiating substance and/or to observe concentrations, or absences thereof, in areas or organs of the patient for diagnostic purposes. Instruments which may be used for this purpose include a scintillation image detector as described in U.S. Pat. No. 3,011,057, and the conventional radioisotope scanner, as described at pages 381 to 387 of the text Instrumentation in Nuclear Medicine by Gerald J. Hine, published by Academic Press, New York, 1967. However, these instruments produce only a single two-dimensional readout or scintigram showing the radiation sources in a single plan view without discrimination as to the depth of the radiation sources within the subject. By equipping the scanner with a focused collimator, a readout is obtained which is sharply focused at only one depth, namely, the geometric focal plane of the collimator.

An object of the present invention is to provide an apparatus and method of the character described which will afford in a single scan of the subject a plurality of high resolution readouts of the distribution of radioactivity in the subject, each being focused at a different depth. Radiation sources above or below each readout plane are blurred in that readout. By noting the readout that shows a particular source or object most sharply, the depth of that source or object can be determined.

Another object of the present invention is to provide an apparatus and method by which the multiple readouts as above described may be recorded on photographic film or stored in and obtained from a computer.

Referring to the drawings:

FIG. 4 is a schematic elevational view of the probe and a radiation source disposed on the axis thereof in a near plane A;

FIG. 5 is a schematic plan view of the scintillator forming part of the probe and showing the position of a scintillation cluster produced by the radiation source shown in FIG. 4;

FIG. 6 is a view similar to FIG. 4 but illustrates the probe after moving a distance "L" from the position illustrated in FIG. 4;

FIG. 7 is a schematic plan view of the scintillator and showing the position of a scintillation cluster produced by the radiation source shown in FIG. 6;

FIGS. 8 through 11 are a series of views similar to FIGS. 4 through 7 illustrating the position and movement of a scintillation cluster over the scintillator produced by a radiating source in a second plane B;

FIGS. 12 through 15 are a series of views similar to FIGS. 4 through 7 illustrating the position and the movement of a scintillation cluster over the scintillator produced by a radiating source in another plane D;

FIGS. 16 through 19 are a series of views similar to FIGS. 4 through 7 illustrating the position and the movement of a scintillation cluster over the scintillator produced by a radiating source in another plane E;

Figure 21:
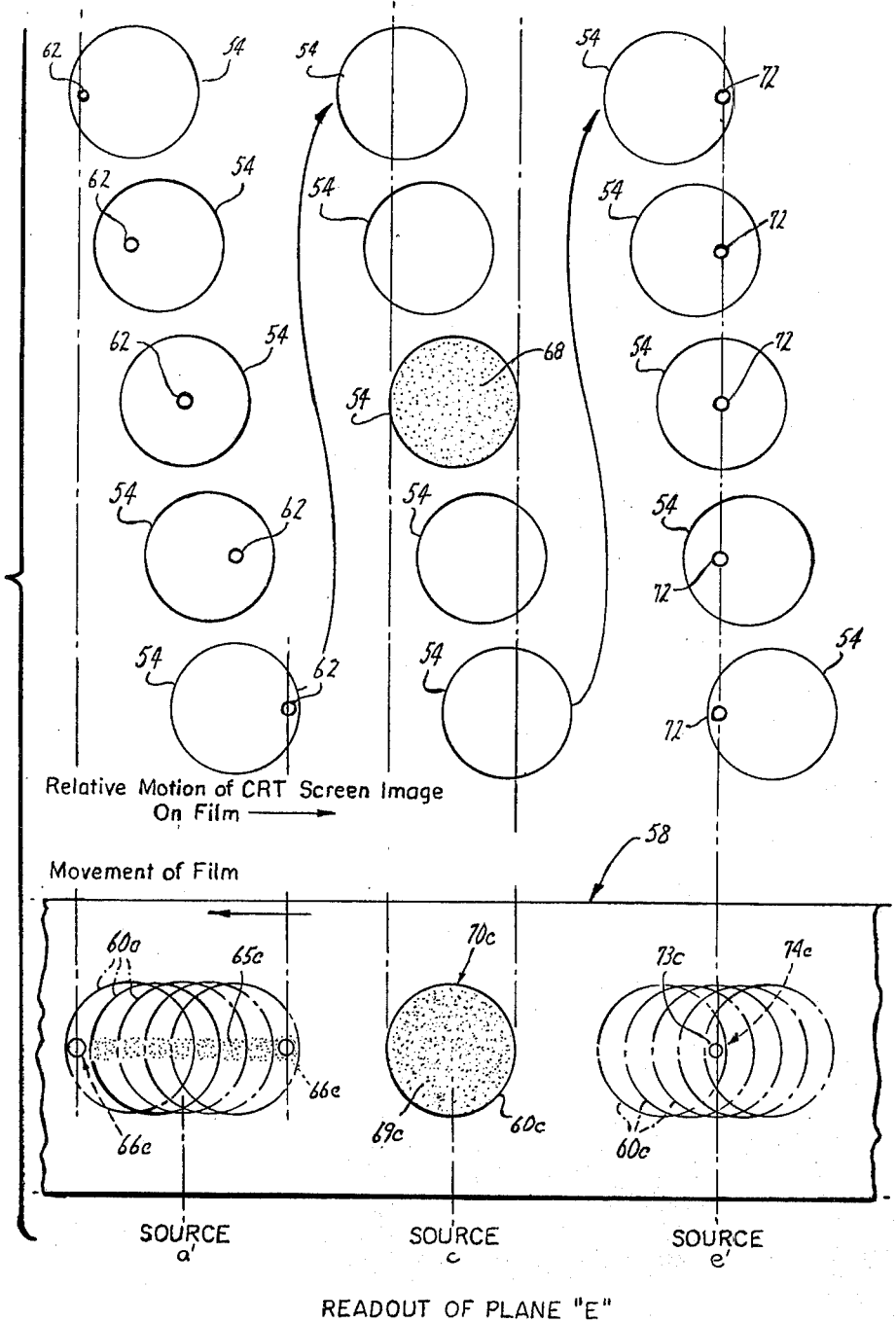
Figure 25:
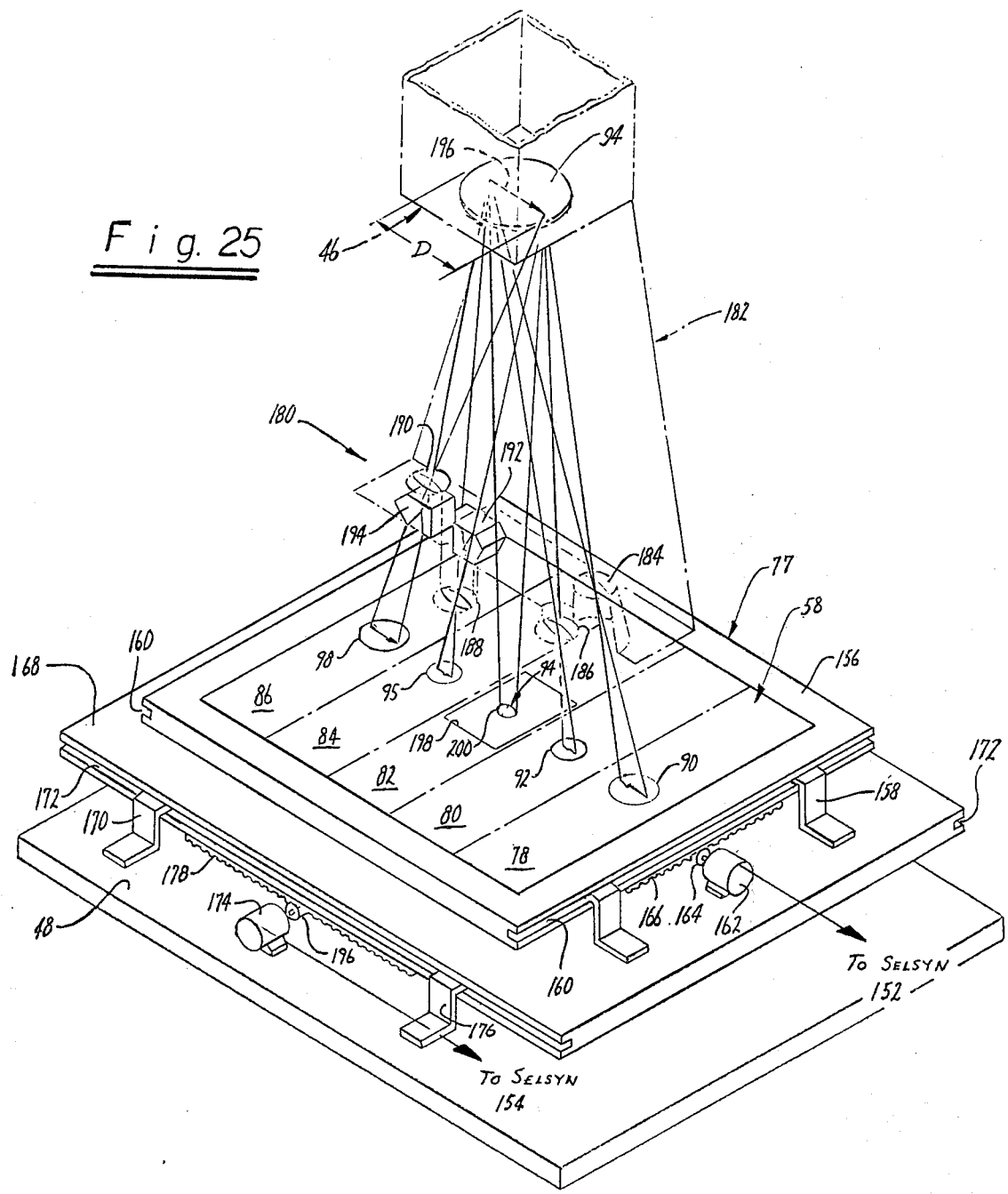

FIGS. 20 and 21 are schematic representations of the film on which scintillation clusters from radiation sources in the subject are recorded, shows the relative position of the film and a projection of an oscilloscope screen on the film, and further includes an exploded view of the relative positions of the oscilloscope screen projection to illustrate the forming of sharply resolved and blurred readouts on the film;

FIG. 22 is a front view of the oscilloscope screen and the illuminated areas thereon caused by scintillation clusters during five scan lines made by the radiation image detector;

FIG. 23, uppermost view, is a schematic representation of the path taken by the projected image of the oscilloscope screen on the film during the scan;

FIG. 23, other views, are schematic representations of the paths taken by the projected image on five different fields representing planes A – E;

FIG. 24 shows schematic representations of readouts of the planes A – E of FIG. 23; and FIG. 25 is a more complete illustration of the optical system constructed in accordance with the present invention for providing the readout shown in FIG. 24.

Figure 3:
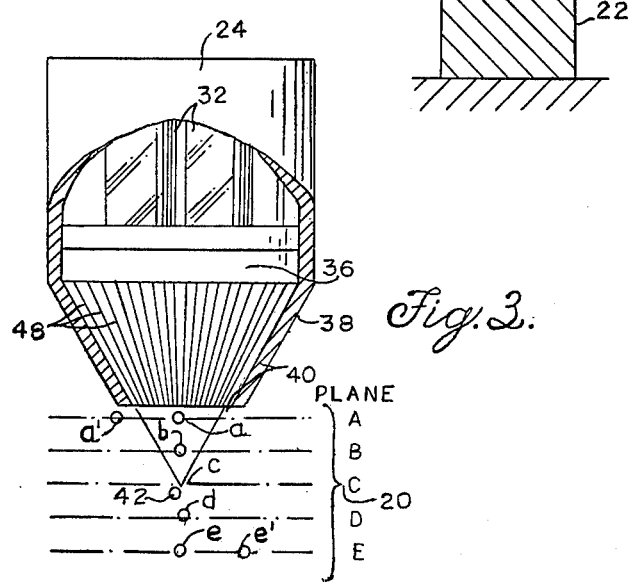
FIG. 3 is an elevational view of a gamma-ray image probe with portions broken away, and radiation sources disposed in several, spaced apart planes.

The apparatus of the present invention comprises briefly the combination of the following:

a. a radiation image forming means 38, here in the form of a focused collimator, for producing radiation images of radiating sources $a, b, c, d,$ and $e$, see FIG. 3, in a subject 20 to be examined. One of the characteristics of a focused collimator is that the relative positions of the radiation images of sources in different locations within the subject will vary with the relative position between the collimator and the subject;

b. means converting the radiation images into an output defining the positions of the radiation images. This means may comprise a radiation image detector, as more fully shown and described in Anger Pat. No. 3,011,057. The principal components of the image detector are a scintillator 36 mounted at the exit end of the collimator 38; an array of phototubes 32 disposed with their light sensitive elements viewing the scintillator and spaced a short distance therefrom; and image deriving circuits consisting of summing circuits, subtraction circuits, pulse height selector circuits, optional ratio circuits, etc., as described in U.S. Pat. No. 3,011,057 for converting the electrical outputs of the phototubes into coordinate X and Y signal outputs; denoting the position of the scintillations in the scintillator.

c. means 26, here in the form of a scanning frame, for effecting relative displacement between collimator 38 and subject 20 for examining the subject from a plurality of positions, the scanning frame providing output signals defining the relative positions between the collimator and subject; and d. means, as for example the optical projection lens system 180, film 58, and film mounting and drive tables 77, see FIG. 25, for modifying at least one of the first or second above enumerated outputs and combining these outputs as modified to provide at least one radiation distribution readout, such as the scintigrams 78, 80, 82, 84 or 86 in FIG. 25, each scintigram having a preferential focusing effect for radiating sources located on a selected plane in the subject.

The focused collimator 34 is a standard article of manufacture obtainable from Ohio-Nuclear Corporation of Cleveland, Ohio. These collimators have approximately 100 to 600 tapered channels, the axis of each channel being aligned toward a focal point that is commonly 3½ inches from the entrance face. Such a collimator is then said to have a focal length of 3½ inches. Such collimators 36 are made for use with 3 inches, 5 inches, or 8 inches scintillators, the latter size being preferred in the present instance.

Various scintillators are available. The preferred scintillator at present is a thallium-activated sodium iodide crystal as manufactured by Harshaw Chemical Company of Cleveland, Ohio. These are available in various sizes, a crystal about 8½ inches in diameter and 1 to 1½ inches thick is suggested for present purposes.

An array of seven phototubes 32, as shown in Patent 3,011,057, is preferably used. These may be conventional 3 inch bi-alkali photocathode tubes with copper beryllium dynodes as manufactured by Radio Corporation of America.

The scanning frame 26 and its power drives is a standard product manufactured by Ohio-Nuclear of Cleveland, Ohio. Such a unit provides rectilinear scanning motion for the radiation image probe at scanning speeds up to about 200 inches per minute, a width of scan up to 16 inches, variable scanning line spacing from one-sixteenth to one-fourth inch, and a scan length up to 64 inches.

The collimator and radiation image detector are conveniently combined into a single radiation image probe 24, sometimes hereinafter referred to as a probe.

General considerations of rectilinear scanning are more fully treated on pages 381 to 426 of the text Instrumentation in Nuclear Medicine by Gerald J. Hine, published by Academic Press, New York, 1967. Scanner 26 includes a stationary platform or table 106 with supports 108, there being sufficient clearance under the table 106 for positioning subject or specimen 20 on another table 22. Usually, only a small portion 110 of the subject is of interest. A lower movable platform 112 is supported on table 106 on wheels or rollers 114 and adapted to roll across table 106 in grooves or tracks 116. A motor 118 on table 106, upon closing of power switch 120, pulls the movable platform 112 by winding a line 122 onto a drum 124 driven by motor 118. A normally closed microswitch 126, electrically connected in series with motor 118, automatically stops forward travel of the lower movable platform 112 when operated by tab 128 affixed to the platform. An upper movable platform 130 is supported on wheels 132 riding in grooves 134 in the top surface of lower movable platform 112, grooves 134 being oriented 90° with respect to grooves 116 in table 106. First and second motors 136 and 138 are alternately energized to draw the upper platform alternately in opposite directions as controlled by a normally closed limit switch 140 and a normally open limit switch 142, both affixed to lower platform 112. A tab 144 on upper platform operates the limit switches at the desired limits of travel. A relay coil 145 is connected in series with limit switches 140 and 142. When a power switch 146 is closed, motor 138 is energized through relay contact 148, since relay coil 145 is not energized. When limit switch 142 is closed by tab 144, motor 136 is energized through contact 148 and motor 138 is de-energized. Relay coil 145 remains energized through holding contact 150 until the operation of motor 136 causes tab 144 to open normally closed limit switch 140. The relay is thereby de-energized and motor 138 is again energized.

A pair of selsyn transmitters 152 and 154 are mechanically connected to detect motion of the upper and lower platforms respectively, each selsyns having geared teeth engaging a rack fixed to the associated platform. Electrical (second output) signals indicating the X-Y coordinate position of the collimator 38 and the radiation image detector 24 with respect to subject 20 are produced by the transmitters 152 and 154 and are employed to remotely repeat the motion of the platforms as described hereinafter.

The radiation image detector 24 is mounted on the upper platform 130 and extends downwardly therefrom to view subject 20. The detector 24 is moved in a rectilinear scan pattern across the portion 110 of the subject. To provide such a scan, motor 118 is momentarily energized each time one or the other of motors 136, 138 is de-energized to move lower platform 122 an increment equal to the spacing of the scan lines to the right, as viewed in FIG. 1.

In accordance with the present invention the means as defined in subparagraph "b" of the combination hereinabove set forth may provide an output in the form of either an optical image or a set of coordinate signals. An optical image output is used in the system illustrated in FIG. 25 and is provided in the present apparatus by a cathode ray tube of an X-Y oscilloscope 46 connected to the image deriving circuit 44. An alternative means as defined in subparagraph "d" above may be provided by a computer device 202. In the latter case the coordinate signals obtained from the image deriving circuit 44 are fed to the computer device 202.

Other radiation image forming and detecting sytems may be used. The radiation image forming means may consist of a variety of types of collimators which will function in conjunction with a proper scanning movement with respect to the subject to provide a discrimination in the position of the radiation images on the radiation image detector that depends on the depth of the radiation sources in the subject. With appropriate scanning motion, a pinhole collimator or a variety of multiple-channel collimators may be used, such as a focused collimator, or a divergent channel collimator. An important requirement is that the use of a particular collimator must be combined with a scanning mode or motion so that the radiation images of sources located at different depths will move with respect to one another during the scanning. Also, various image detecting systems may be used, such as the combination of a collimator, scintillator and image amplifier; collimator and spark chamber; or collimator and cluster of gamma-ray counters, each consisting of a small scintillator and a single direct coupled phototube. The latter may be used with image deriving circuits and cathode-ray tube readout to provide an optical output, or the signals from the image deriving circuit may be fed to a computer as above explained.

Radiation, such as gamma rays from the radiating sources in the subject, will pass through the collimator channels 40 open to them and will strike the scintillator. Many of these will produce light flashes while others will pass through the scintillator without producing a light flash. The gamma rays emanating from each source may pass through one channel or a plurality of adjoining channels, depending on the location of the source with respect to each collimator channel.

The gamma rays always travel in straight lines unless scattered by intervening matter. Thus when a radioactive source is within view of the scintillator through the collimator holes, a series of light flashes will appear in the scintillator, and the area over which the flashes are distributed will depend upon the number of channels which are lined up with the source. The walls of the channels absorb nearly all gamma rays which impinge on them. Each scintillation lasts only a fraction of a microsecond and is sensed individually by the phototubes which feed electrical impulses to the image deriving circuit 44 where the impulses are transformed into output signals that indicate the position and intensity (brightness) of each scintillation. The intensity signal goes to a pulse-height selector which allows only full-intensity signals from unscattered gamma rays to pass. In one form of the invention as above explained, the position signals and the selected intensity signals are transmitted to a cathode-ray oscilloscope 46 where scintillations caused by the selected gamma rays appear as light flashes on the screen 54 of the cathode-ray tube in the same relative position as that of the scintillations in the scintillator.

In the present instance subject 20, as depicted in FIG. 3, is divided into five planes A through E and there are illustrated five radiation sources "a" through "e", each radiation source lying in the correspondingly lettered plane and, for the purposes of the following discussion, shown disposed on the center line of probe 24 and collimator 38. Also shown in FIG. 3 are radiating souces a' and e', located to the left and the right, respectively, of the center line. Radiation from sources "a" through "e" can enter one or more of channels 40 to strike scintillator 36 and cause scintillations to appear therein.

To aid in the understanding of the present invention, probe 24 is shown in FIGS. 4 through 19 in two positions while aimed generally toward the radiating sources "a" through "e".

Referring now to FIGS. 4 through 7, radiation from source "a" can enter only those of the channels 40 of collimator 38 which are aimed at the source. These are a relatively small number of channels while walls 48 of the collimator shield all remaining radiation from source "a" and prevent it from reaching the scintillator. Consequently, when the probe is in its original position (shown in FIGS. 4 and 5) a relatively small scintillation cluster 50 occurs in the scintillator 36 at the center 51 of the scintillator.

As the probe moves to the right during its scanning motion, radiation from source "a" can reach the scintillator only through other channels 40. After the probe has traveled a distance "L" as shown in FIG. 6, radiation from source "a" reaches the scintillator through channels 40 which are further to the left of the center of the collimator and cause the appearance of scintillation cluster 50 at a point 52, spaced from point 50 to a distance $L_a$ which is greater than the distance "L" traveled by the probe. Thus, the scintillation cluster moves across the scintillator at a speed other, e.g., greater, than the scanning speed of the probe. In addition, the movement of the scintillation cluster in the scintillator is directionally opposite to the movement of the probe.

Referring to FIGS. 8 through 11, the probe is again shown in two positions during its scanning motion which are spaced apart a distance "L" and the radiating source "b" located in plane B is considered. Rays from this source enter in the first instance through channels disposed around the center of the collimator to form a scintillation cluster 50 at point 51. Radiation from source "b", located closer to the focal plane C of the focused collimator than plane A, can reach scintillator 36 through a greater number of channels than radiation from source "a". The scintillation cluster caused by source "b" is, therefore, larger than the cluster from source "a". As the probe moves to the right, radiation from source "b" can again only reach scintillator 36 through channels other than the ones disposed around the center of the collimator. After the probe has traveled a distance "L" (shown in FIG. 10) radiation from source "b" reaches the scintillator only through the outermost channels 40 of the collimator. Consequently, the scintillation cluster is now at point 52 which is closely adjacent the periphery of the scintillator as illustrated in FIG. 11. Thus, while the probe has again moved a distance "L" the scintillation cluster caused by radiation from source "b" has moved a distance $L_b$ which is substantially longer than the distance $L_a$ in FIG. 7. The speed with which the scintillation cluster moves across the scintillator is, therefore, not only different from the scanning speed of the probe, but differs from the speed with which the scintillation cluster caused by source "a" moves over the scintillator.

FIGS. 12 through 19 are substantially similar to FIGS. 4 through 11 except that they illustrate the movement of scintillation clusters caused by radiation sources "d" and "e" located in planes D and E, respectively. It will be observed that while the probe again moves a distance "L", scintillation clusters from the sources "d" and "e" have moved distances of $L_d$ and $L_e$ respectively (which equal the distances $L_a$ and $L_b$) provided planes D and E are spaced, as here shown, the same distance as planes A and D, from the focal plane C of the focused collimator. Consequently, the scintillation clusters move across the scintillator at the same speed as the scintillation clusters caused by sources "a" and "b". However, the scintillation clusters from sources "d" and "e" move in the opposite direction to the clusters caused by sources "a" and "b", or in the same direction as the movement of the probe.

It will thus be seen that the speed with which the scintillation clusters move across the scintillator, and their relative position on the scintillator at any given instant, are directly related to the distance between the radiating source and the focal plane C of the collimator.

A special case is encountered when the radiating source is located on plane C, the focal plane of collimator 38, as, for example, source "c". The collimator shields the scintillator 36 from radiation emitted by source "c" at all times except when focal point 42 of the collimator is very close to the location of source "c". Radiation from source "c" can then reach the scintillator through all of the channels 40, thereby causing scintillations to occur throughout the crystal. The scintillations disappear as soon as focal point 42 of the collimator has moved substantially past the source "c".

Assuming that an optical readout is desired, and referring to FIG. 20, a sharp readout of all radiation sources located in, say, plane A is obtained as follows. The scintillation clusters occurring on scintillator 36 are reproduced on oscilloscope screen 54 in the form of a cluster of light flashes which have the same relative size and position on the screen as do the scintillation clusters on the scintillator. A lens system, later described, projects the light emitted by the oscilloscope screen onto a photographic film 58 to form an image 60a of the oscilloscope screen on the film. The film moves relative to the oscilloscope screen in synchronism with the motion of probe 24.

Referring to FIGS. 3 and 20, assume that the probe scans past three sources, namely, source $a'$ located in plane A and to the left of center; source "c" located at the focal point 42 of the collimator 38 in plane C; and source $e'$ located to the right on plane E; and that the probe moves from the left to the right. A scintillation cluster first appears on the right-hand periphery of the scintillator and, correspondingly, an illuminated area or cluster of light flashes 62 appears on the right-hand side of the oscilloscope screen image 54, see FIG. 20. In FIG. 20, the position of the oscilloscope screen image 54 relative to film 58 during the movement of the film from right to left is illustrated schematically and in an exploded manner above the film. FIG. 20 further illustrates the relative positions of the projected oscilloscope screen image 60a as projected onto the film by the lens system while the film moves past the oscilloscope.

When cluster 62 first appears on screen 54, the projected screen image 60a is closest to the left-hand edge 64 of the film. As the probe 24 continues to scan past source $a'$, the scintillation cluster on the scintillator and the cluster 62 on the oscilloscope screen 54 move to the left at a rate of speed which is proportional to the height of source $a'$ above focal plane C. The lens system projecting the screen image 60a onto the film is so selected that the projection 66a of cluster 62 moves relative to the projected screen image 60a at a speed and in a direction equal to the speed and the direction of the relative motion between projected screen image 60a and film 58. As a result thereof the relative position of the projected cluster 66a on film 58 remains stationary with respect to the film from the moment cluster 62 first appears on the screen 54 until the moment cluster 62 disappears therefrom. This means that the same area of film is exposed for the full length of the appearance of cluster 62, resulting in a sharply resolved or focused photographic image 65a on the film which has the same size as projected cluster 66a. The relatively long exposure of the same film area to the light from cluster 62 further results in a photographic image having high intensity as well as good definition.

As the probe continues to scan the subject, focal point 42 of collimator 38 will momentarily coincide with the location of source "c" in plane C whereby radiation from that source can enter through all channels 40 and illuminates the full area of the scintillator. This causes a full illumination of the oscilloscope screen 54 as indicated at 68. The lens system also projects the image of the fully illuminated oscilloscope screen onto film 58 at 70a and thereby momentarily exposes the film to the light from the fully illuminated screen. Due to the short duration of the full illumination of the screen, a photographic image 69a of the same size as the projected oscilloscope screen image 70a, and of lower intensity than photographic image 65a, is formed on the film. Thus, source "c" is not rendered sharply in this readout.

A scintillation cluster caused by radiation from source $e'$ in plane E first appears on the left-hand side of the scintillator, since source $e'$ is on the opposite side of the focal plane C of the collimator, and moves toward the right-hand side of the scintillator as the probe scans past source $e'$. A corresponding cluster 72 moves across oscilloscope screen 54 with the same speed as cluster 62, but now in the opposite direction to cluster 62 and opposite to the direction of the relative movement between the film 58 and oscilloscope screen 54. The lens system projects cluster 72 onto the film at 74a but, instead of exposing the same area of film, as is the case when projecting cluster 62, the relative position of the projected cluster on the film changes constantly. This results in a photographic image 73a that is spread out or blurred and of lower intensity than photographic image 65a.

It can now be seen that even though two sources overlie one another as do sources "a" and "d", for instance in FIG. 3, only the image resulting from radiation sources located in plane A, the plane on which the particular readout is focused, are sharply resolved. Images on the film from radiating sources in planes other than plane A are blurred. Upon the inspection of the film, radiating sources located in plane A can thus be identified.

In accordance with the present invention, readout is not limited to a single plane in the subject. To focus another readout in plane E, for example, a second lens system provides for inverting the screen images 60e projected onto film 58, as illustrated in FIG. 21. Although clusters 62, 68 and 72 appearing on the screen 54 as a result of radiation from radiating sources $a'$, "c" and $e'$ move across the oscilloscope screen in the same direction as before, their movement on the film will be in a reverse direction. Consequently, the projected image 66e now moves across the film, thereby resulting in an elongated, blurred photographic image 65e of low intensity. The momentarily appearing full illumination of the screen caused by radiation from source "c" is projected onto the film at 70e in the same fashion as shown in FIG. 20 and again causes a large, blurred photographic image 69e of low intensity. Cluster 72, caused by radiation from source $e'$, is projected onto the film at 74c but moves with a speed and in a direction equal to the relative motion between the film and oscilloscope screen 54 so that the projected cluster 74c exposes the same area of film at all times. Projected cluster 74c thereby forms a sharply resolved or "in focus", high intensity photographic image 73e. The readout for plane E is projected on to a separate portion of the film and provides a scintigram in which all radiating sources located in plane E of the subject are sharp, of high intensity and can, therefore, be identified. It will be noted that radiation from sources located on other planes again cause blurred and low intensity photographic images in this scintigram which are distinguishable from images caused by radiation across sources in plane E.

A scintigram focused on focal plane C represents a special case. When probe 24 passes over radiating source "c", and the focal point 42 of the collimator 38 and source "c" coincide, radiation from source "c" enters through all channels 40 of the collimator and momentarily causes scintillations throughout the scintillator. Accordingly, the full area of oscilloscope screen 54 is illuminated. To obtain a sharply resolved readout, a lens must project the full oscilloscope screen onto the film but reduce the size of the image almost to a point. Since the illumination of the screen from a source in the focal plane is of short duration, the photographic image on the film has a size equal to the size of the projected screen image. All clusters of light flashes from radiating sources on planes other than the focal plane appear on the oscilloscope screen for extended time periods. However, since the lens system used for the focal plane scintigram reduces the size of the projected CRT image, and hence reduces the speed of movement of the clusters therein, a relative speed difference occurs between the projected clusters and the film which results in blurred low intensity images which are clearly discernible from photographic images caused by sources in the focal plane.

By appropriately determining the size of the projected screen image, a focused readout can thus be obtained for any desired plane. Accordingly, in the present apparatus, a set of lenses 180 are used to project different screen sizes on different portions of the film, see FIG. 25, to provide in a single scan a number of readouts, each focused on a different plane in the subject. It will further be apparent from the foregoing that it is not necessary to scan the subject, although that is presently preferred; but the same effect can be obtained by viewing the subject from several different locations. This can be accomplished by, for example, viewing the subject with the same probe from the different positions or by employing several spaced apart image detectors each of which is coupled to an oscilloscope and by simultaneously projecting images of the oscilloscope screens onto photographic film with suitably selected lens systems.

Where rectilinear scanning of the subject is used, the spacing of the scan lines should be relatively close to avoid missing radiating sources between adjacent lines of the scan. As a result, sources generally appear on the CRT screen in more than one scan line. Referring to FIG. 22, a scintillation cluster 76 from a radiating source in the subject appears in scintillator 36 during scan line 1 first along the top of the scintillator. During the second scan line the scintillation cluster again appears in the scintillator as the probe scans past the radiating source but it is now located further toward the center of the scintillator. Similarly, during scan lines 3, 4 and 5, the scintillation cluster moves downward in increments, the magnitude of which is dependent on the spacing of the scan lines, toward the opposite side of the scintillator until it disappears during the sixth (not shown) scan line of the probe past the source. The appearance, motion and relative position of the scintillation cluster 76 on scintillator 36 is, of course, duplicated by the appearance of a corresponding cluster of light flashes on the oscilloscope screen. Thus, the representation of the scintillation cluster in FIG. 22 can also be considered as representing the corresponding cluster on the oscilloscope screen.

Referring to FIGS. 22 and 23, in each successive scan line, the scintillation clusters are offset in a direction perpendicular to the direction of the scanning motion by an amount that is a function of the spacing between scan lines. Considering again readout of plane A for focusing radiating sources located in plane A, the resulting offset of the projected cluster 88a with respect to the projected oscilloscope screen image 90 is equal to the spacing between scan lines of film 58 (and therewith of field 78) only if the cluster results from a radiating source located in plane A. If the radiating souce is located in another plane, the magnitude of the offset of projected light dot 88a is greater or lesser than the spacing between scan lines of the film. In that event the projected light dot 88a exposes an area of field 78 which is not the same as the area exposed during the first scan line. Consequently, the area of the film exposed to a projected cluster from a radiating source not in the readout plane is not only elongated in the scanning direction (as illustrated in FIGS. 20 and 21) but is also elongated in the perpendicular direction. The resulting image on the film, therefore, is blurred, or in other words, is substantially larger in size than the size of the projected cluster.

Referring to FIG. 23, five simultaneous readouts focused on five different planes are obtained as follows. The probe 24 starts its scanning motion at 0, the origin of the X, Y system, and scans over the subject as illustrated in FIG. 23. Assuming a stationary oscilloscope, the lens system projects several images of the oscilloscope screen onto the film so that at the start of the scanning motion the center of the projected oscilloscope screen images are at 5 different points, point 0' on the film. To obtain sharp readouts sharply focused on five planes, the lens system projects five images of the oscilloscope screen onto five different film fields 78, 80, 82, 84 and 86, each field representing a complete scintigram or radiation record of the source and each of which is focused on one of the planes A through E. The film moves past the oscilloscope screen in synchronism with the motion of probe 24 but not necessarily with the same speed as the probe. To obtain radiation records of more convenient size it is preferred to move the film at only a fraction of the speed of the probe past the subject. The physical size of the radiation record is thereby substantially reduced.

Assuming now that probe 24 is at the position indicated in the upper part of FIG. 23, the position having coordinates $x_1$ and $y_1$ and a scintillation cluster appears at point 88, having coordinates $x_2'$, $y_2'$ with their origin at point 87, the center of the scintillator. A cluster of light flashes corresponding to scintillation cluster 88 appears at the same relative position on the oscilloscope screen and, for five readouts A through E, a lens system projects five images 90, 92, 94, 96 and 98, one on each of the five fields of the film. The lens system is selected so that the size of each of the five projected oscilloscope screen images is such that the velocity and direction of movement of projected clusters caused by radiating sources located in the respective planes equal the speed and direction with which the film moves past the oscilloscope screen. At any one instant of time the $x'_1$, $x'_1$ position of the oscilloscope screen's projected image corresponds to the $x_1$, $y_1$ position of the probe, and the $x'_2$, $y'_2$ position of the projected cluster corresponds to the $x$, $y$ position of scintillation cluster 88 on the scintillator. Referring to FIGS. 3 and 23, to obtain a sharp readout of radiation from, say, source "a" in plane A on readout A, the velocity $v'$ of cluster 88a projected onto field 78 must equal the direction and velocity $v_f$ of the film with respect to the oscilloscope screen.

If $v$ is the velocity of the cluster across the oscilloscope screen resulting from a scintillation cluster moving across the scintillator of the probe as a result of radiation from any radiating source regardless of its depth in the subject and $v_f$ is the velocity of the film relative to the oscilloscope screen, then $$v_f = kv = v$$

to obtain a sharp readout on the film for any particular cluster moving across the oscilloscope screen. Factor k is a constant and represents the magnification or reduction factor of the lens projecting the oscilloscope screen onto a particular field of the film. The magnification factor $k$ is selected so that any particular lens in the lens system reduces (or magnifies) the projected oscilloscope screen image by a factor $k$ which causes all clusters moving across the oscilloscope screen as a result of radiation from sources in a selected plane to move with a projected velocity v equal to the velocity $v_f$ of the film. If the lens system is selected as described above, then each field of the film or readout, will show a sharply resolved image for clusters caused by radiating sources in the selected planes.

As indicated earlier, a readout focused on focal plane C represents a special case. When probe 24 passes over radiating source "c" and the focal point 42 of the collimator 38 and source "c" coincide, radiation from source "c" enters through all channels 40 of the collimator and momentarily causes scintillations throughout the scintillator. Accordingly, the full area of oscilloscope screen 54 is illuminated with flashes representing the scintillations. The lens system must, therefore, project onto film field 82 an image of the full oscilloscope screen which is of small size and high light intensity in order for the momentary light flashes on the screen to produce a sharp photographic image of high intensity on the film. As is more fully described hereinafter in the presently preferred form of this invention, a plate may be employed which has a small aperture through which light from the screen image is allowed to reach the film. The aperture plate can, for practical purposes, be replaced by a lens with a very short focal length.

The size of projected screen images 90, 92, 94, 96 and 98 needed to obtain sharply resolved readouts of radiating sources in given planes with maximum resolution can further be determined according to the following formula in which: S is the probe scanning speed, S' is the film scanning speed, "a" is the acceptance angle of the focused collimator 38 (total angle of view), D is the diameter of the image of the effective area of the oscilloscope screen as projected on film 58, "f" is the distance from the focal point 42 to the collimator, and "b" is the distance from a given readout plane to the collimator. The relationship is:

$$D = \frac{2S'}{S}(f-b) \tan \frac{a}{2}$$

The equation gives the required diameter D of the screen image projected on film 58 for maximum resolution of radiation activity lying on a plane located a distance "b" from the collimator. Without any change in scanning speeds or any other parameter, activity in other planes can be read out with maximum resolution by projecting screen images of various sizes on the film. The image size is controlled by the placement and the focal length of the lens employed. If "b" is larger than f, D is a negative number and image inversion is required.

Referring to FIG. 24, five readouts on five fields 78, 80, 82, 84 and 86 of the film 58 resulting from radiating sources "a", "c" and "e" is illustrated, the fields being shown spaced apart for clarity of illustration although in reality they are closely adjacent each other. Field 78 represents a focused scintigram of the distribution of radiating sources in plane A. Photographic image 100a is sharply resolved and high intensity since it is caused by radiating source a' located on plane A in FIG. 3. Photographic image 102a is caused by radiating source "c" in plane C and in this readout is blurred and of lower intensity than image 100a. Photographic image 104a results from radiating source e' in plane E and is of still lower intensity and larger size than image 102a. The greater size of image 104a is due to the greater difference in the velocity of the film with respect to the cluster resulting from source e' as projected onto field 78, because the film and the projected image move in opposite directions. In field 80 all images are relatively low in resolution and intensity since none of the sources a', "c" and e' are located in plane B. In field 82, image 102c resulting from radiating source "c" is sharply resolved while images 100c and 104c, from sources a' and e' are blurred and low intensity. Field 84 shows images similar to field 80, in which none of the images are sharp. In field 86 image 104c is sharply resolved and high intensity, while images 100e and 102e are low resolution and low intensity.

The size of the sharply resolved photographic images is almost the same on all fields even though the scintillation clusters in the scintillator and the clusters of light flashes on the oscilloscope screen, respectively, vary in size with the distance between the focal plane of the collimator and the plane in which the source is located. This results when the proper diameter D is selected for the projected oscilloscope image.

Referring now particularly to FIG. 25, photographic film 48 is affixed to an upper movable table 156 supported by guides 158 at opposite ends of the table, the guides fitting into grooves 160 in the ends of table 156. A selsyn receiver 162 receives the output signals from selsyn transmitter 152 (shown in FIG. 1) and drives gear wheel 164 which engages a rack 166 on table 156, causing the table to move in synchronism with upper platform 130 shown in FIG. 1. Selsyn receiver 162 and guides 158 are affixed to a lower table 168. Guides 170 fit into grooves 172 in the lower table which is driven by selsyn receiver 174 through gear wheel 176 and rack 178. Selsyn 174 is connected to and follows selsyn transmitter 154 shown in FIG. 1. Thus, film 58 moves in synchronism with probe 24. The rate of movement of the film may, of course, be slower or faster than that of probe 24 to provide scintigrams that are larger or smaller than the area scanned by probe 24.

oscilloscope 46 is suitably mounted with its screen 54 directed toward film 58. Lens system 180 is mounted to a holder 182 which is in turn fixed with respect to oscilloscope 46. The lens system comprises four lens sets 184, 186, 188 and 190, the latter two comprising image inverting triplet lenses or including image inverting prisms 192 and 194, which project images 90, 92, 94, 96 and 98 of screen 54 on the film fields 78, 80, 84 and 86, respectively. The distance between the lenses and film 58 is chosen so that the size of the projected oscilloscope screen image on the different fields of the film is as discussed earlier. For illustrative purposes, an arrow 196 is shown on screen 54 to indicate the inversion of the projected oscilloscope screen images in fields 84 and 86. An aperture plate 198 is further mounted to the lens holder and includes an aperture 200 to allow exposure of a very small area of film by the full oscilloscope screen on film field 82.

To obtain multiple scintigrams or readouts of the distribution of radioactivity in subject 20 placed on table 22, tables 112 and 130 of scanning apparatus 26 are first located so that the center of probe 24 is positioned at the origin (0 in FIG. 23). Power switch 146 is closed and the scanning motion commences. As probe 24 scans past the subject, radiation from sources in the subject cause scintillation clusters in scintillator 36 of probe 24 and corresponding clusters of light flashes appear on screen 54. Film table 156 moves in synchronism with probe 24, and lens system 180 projects images of all light flashes, irrespective of the depth of the originating radiating sources in the subject. Each lens set 184, 186, 188 and 190 projects an image of the oscilloscope screen as well as flashes appearing thereon onto the film fields 78, 80, 82, 84 and 86 (see FIGS. 23 and 24). Each such flash will be recorded on each of the film fields, but only clusters of flashes which originate from radiating sources located in the selected planes will leave a high intensity sharply resolved photographic image on the respective film fields. Clusters originating from sources on other planes produce blurred low intensity photographic images. After the desired area of the subject has been fully scanned by probe 24, power switch 146 is opened and the device is de-energized. Film 58 is removed from table 156 and developed, and upon inspection of the several scintigram readouts, the position and resolution of radiating sources in the selected planes can be determined, thereby giving the observer an indication of the depth at which the various radiating sources are located. If the subject is a living organ, for example, the location of tumorous tissue can thus be determined in regard to its depth as well as its location in the X–Y axes of the scintigrams.

It should be noted that radiating sources located closely adjacent to the pre-selected planes but not thereon, provide relatively high intensity, sharply resolved images, although they are not as sharp as the images from radiating sources directly in the selected planes. By arranging the lens set such that the selected planes are spaced sufficiently closely together a more exact indication of the depth of radiating sources is obtained. Good depth information has been obtained with a spacing of about 1 to 3 cm between the readout planes.

Figure 1:
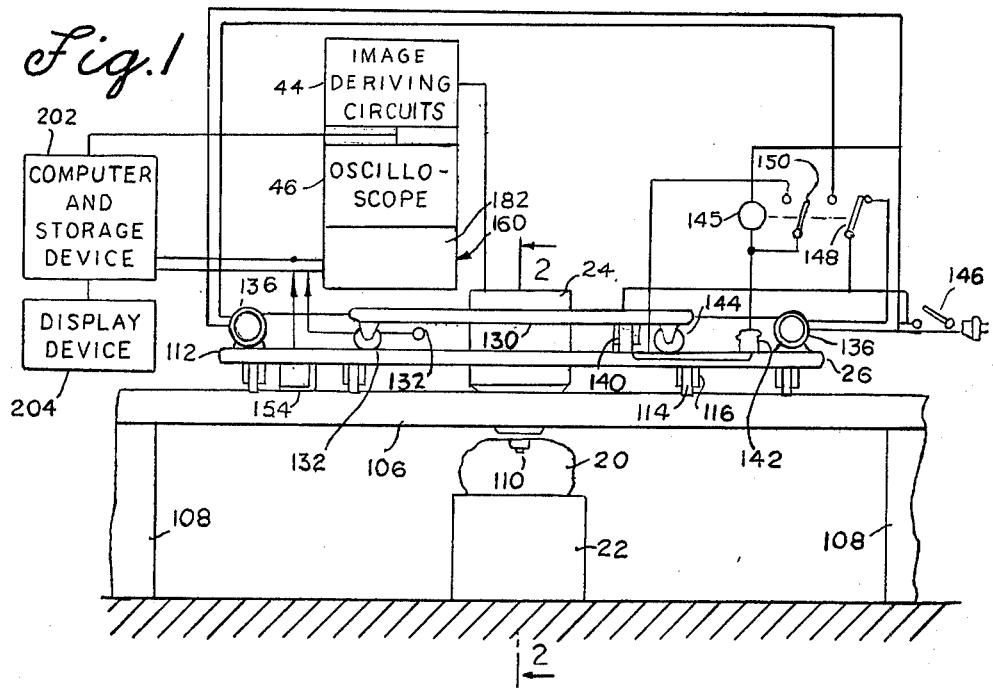
FIG. 1 is a general, front elevational view of a tomographic scanner constructed according to the present invention with the electronic circuitry being indicated in block form.
Figure 2:
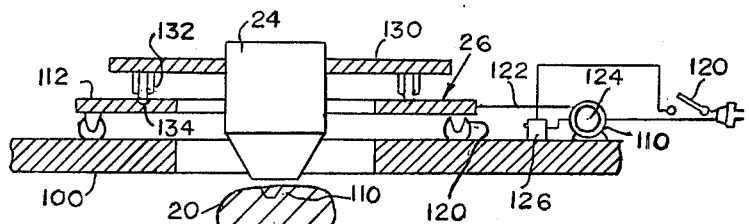
FIG. 2 is a fragmentary, elevational view, in section, and is taken on line 2—2 of FIG. 1.

In another embodiment of this invention, the optical readout system 155 can be replaced with an alternate readout system such as a digital computer device 202, schematically shown in FIG. 1. Images can subsequently be shown on a display device 204 for visual inspection, and numerical data can be extracted by conventional techniques. Such a display device can be either an oscilloscope or an X–Y plotter of the type providing an indication on paper with an inking pen at every point coordinate for which information is obtained. If a computer 202 is employed, and assuming again that it is desired to obtain a readout of five preselected planes, five complete memory core systems may be provided in the computer, one core system to store the final readout for each of the planes A through E. Such readouts of radiating sources in the subject are stored as follows. X and Y position signals are obtained from position-indicating potentiometers that are mechanically connected to scanning table 130 in the same manner as selsyns 152 and 154 in order to indicate the position of probe 24 relative to the subject. In a rectilinear scanning apparatus, the origin of this coordinate system is assumed to be located at one corner of the scan (as illustrated in FIG. 23). When scintillation clusters occur, another set of signals, indicating the $x_2$, $y_2$ position of each scintillation in the scintillator (as shown in FIG. 23) are obtained through the image deriving circuit 44 as previously described. The origin of this second coordinate system is assumed to be at the center of the scintillator 36 and probe 24.

As the probe 24 scans the subject, each scintillation is stored as a single event in each of the five memory core systems in the computer and storage device 202. The storage location is different in each memory system, except for the special case where the scintillation occurs exactly in the center of the scintillator 36, since $x_2$, $y_2$ are then zero. The position coordinates of each event are $X = x_1 + knx_2, Y = y_1 + kny_2$ where $X = x$ — coordinate of a stored event in a given memory core system, $Y = y$ — coordinate of a stored event in a given memory core system, $k$ and $n$ = constants whose values determine the distance from the geometric focal plane C of the collimator 38 to the various readout planes, A, B, C, D and E.

For sharp readout of radiating sources on plane C (the geometric focal plane of the focused collimator 38) $kn = 0$. For this readout, the location at which the detected radiation is stored depends solely on the location of the probe 24. For sharp readout of plane A and B, $kn$ is positive and for planes C, E, $kn$ is negative. The positions of the scintillations within probe 24 then become relevant, and if the polarity and magnitude of $kn$ are correct, the movement of scintillation clusters across the scintillator is exactly compensated for by the movement of the probe 24 and the change in magnitude of the X–Y position signals from the position-indicating potentiometers. Then readouts sharply focused on planes other than the geometric focal plane of the focused collimator are obtained.

If $k$ is a constant and $n$ is assigned the values $+2$, $+1$, $0$, $=1$, and $-2$ for planes A through E, respectively, an equally spaced tomographic series of readouts will be stored in the five memory systems. Giving $kn$ a negative value is equivalent to inverting the image of oscilloscope screen 54 (shown in FIG. 25) with a prism or triple-lens system in the photographic readout described earlier, and changing the value of n is equivalent to changing the size of the image of the oscilloscope screen as projected onto the film. When the coordinates from a selected one of the memory core systems in the computer and storage device 202 are applied to the display device 204, an image is obtained as with the photographic readout previously described.

As a variation, it is possible to directly store data from the image deriving circuit 44 and selsyns 152 and 154 (or the position-indicating potentiometers) and subsequently perform the calculations described to obtain readouts focused on/any desired plane. It should be obvious that there is no restriction as to the number of planes that can be read out and that the various numbers and dimensions used in the above descriptions merely provide examples. It should also be obvious that different means can be employed for obtaining the relative motion between the collimator and the subject, or the subject can be moved while the image detector and collimator are stationary. In addition, the display means and/or lenses can be moved while the film is stationary.

What is claimed is:

1. An apparatus for obtaining a radiation distribution readout of radiating sources located at different depths in a subject, by a single scan of the subject, said apparatus comprising:
   a. a radiation image forming first means for producing images of said sources wherein the relative positions of the images of sources on a plurality of selected different planes within said subject will vary with changes in the relative positions of said first means and said subject during said scan;
   b. image detecting second means converting said images, and producing a plurality of first outputs giving information as to the positions of said images;
   c. third means for changing the relative positions of said first means and said subject for examining said subject from a plurality of relative positions, said third means including means for providing a plurality of second outputs during said scan having information as to said relative positions; and
   d. image deriving fourth means for modifying at least one of said first and second outputs and for combining said first and second outputs as modified to provide a plurality of readouts of said radiating sources having a preferential focusing effect for those of said sources located on said plurality of selected planes in the subject.

2. An apparatus as defined in claim 1 wherein said first outputs are in optical form.

3. An apparatus as defined in claim 1 wherein said first outputs are in the form of electrical signals giving the X and Y coordinates of the positions of said sources.

4. An apparatus as in claim 1 wherein said first and second means include a focused collimator having a geometrical focal point lying in one of the selected planes, and wherein the readout of said image deriving fourth means provides readouts from selected planes which are remote from the geometrical focal point of said focused collimator.

5. An apparatus as defined in claim 4 wherein said first means includes a collimator and said second means includes a radiation image detector which receives said images from said collimator.

6. An apparatus as defined in claim 5 wherein said collimator and detector are connected for joint movement.

7. An apparatus for obtaining a radiation distribution readout of radiating sources located at different depths in a subject, said apparatus comprising:
   a. a collimator for producing radiation images of said sources wherein the relative positions of the images of sources on selected different planes within said subject will vary with the relative positions between said collimator and subject;
   b. means converting said radiation images into optical images displayed on a screen capable of displaying changing images and having positions on said screen corresponding with the positions of said radiation images;
   c. means effecting relative displacement between said collimator and said subject for examining said subject from a plurality of relative positions;
   d. a light sensitive medium receiving said optical images; and
   e. means providing relative positions of said screen with respect to said medium corresponding with the relative positions of said collimator with respect to said subject whereby in a single scan there is provided on said light sensitive medium a plurality of radiation distribution readouts of said radiating sources having a preferential focusing effect for those of said sources located on said selected different planes.

8. A method for forming a radiation distribution readout of radiating sources located at different depths in a subject by scanning of the subject comprising:
   a. producing radiation images of said sources located at different depths by means of a collimator wherein the relative positions of images of sources on selected different planes within said subject will vary with the relative position between said collimator and said subject during a scan;
   b. converting said images into a first output defining the position of said images;
   c. effecting relative displacement between said collimator and said subject for examining said subject from a plurality of positions during said scan to provide a plurality of said first outputs during said scan and obtaining from such a displacement second outputs during said scan defining said last named positions; and
   d. modifying at least one of said first or second outputs and combining said outputs as modified whereby during a single scan there is provided a plurality of radiation distribution readouts having a preferential focusing effect for radiating sources located on said selected planes in the subject.

9. A method as defined in claim 8 including the step of recording the combined outputs.

10. A method as in claim 8 wherein said step of modifying and combining includes:
    a. converting said radiation images into optical images displayed on a screen and having positions on said screen corresponding with the positions of said radiation images;
    b. projecting an image of said screen with said optical images onto a light sensitive medium; and
    c. effecting relative displacement of said medium with respect to the projected image of said screen corresponding with the displacement between said collimator and subject.

11. A method as defined in claim 10 wherein a plurality of different size images of said screen are projected onto different portions of said medium to provide said plurality of radiation distribution readouts, each portion of said medium recording a readout focused on a different plane of said subject.

12. A method as defined in claim 11 wherein said step of modifying and combining includes inverting at least one of said projected images of said screen.

13. In apparatus for producing a preferentially resolved readout of the distribution of radiating sources on a preselected plane without a subject, collimating means for passing radiation from the subject and for forming an intermediate image of at least a portion of the subject, said collimating means being of a type whereby movement of said collimating means causes movement of at least portions of the intermediate image and wherein the rate and direction of image movement are related to the depth of each radiating source within the subject, so that readouts at different depths within the source may be obtained by a single scan of the subject, means for changing the relative positions of said collimating means and said subject and for developing first signals indicative of said relative positions, means for detecting said intermediate images and for developing second signals indicative of the existence and location of said intermediate image, means using said rate and direction of image movement for modifying said second signals and for combining them with said first signals for producing a preferentially resolved readout of sources on said preselected plane.

14. Apparatus as in claim 13 wherein said second signals define an optical image.

15. In apparatus for producing a readout of the distribution of radiating sources located at different depths within a subject by scanning of the subject, a collimator that forms an image of at least a portion of said subject, said collimator being of a kind whereby relative movement between the collimator and the subject during said scan causes movement of at least portions of said image at rates and directions related to the depth of each radiating source in the subject, image forming means coupled to the output of said collimator for converting radiation passed by said collimator into a plurality of light flashes and including a screen for displaying said light flashes in substantially the same relative location as said detected radiations at said collimator output, means for causing relative movement between said collimator and said subject to cause scanning of successive regions of said subject during said scan, a light recording medium, means for forming at least one image of said screen on said light recording medium, means for causing relative movement between said recording medium and said image of said screen during said scan in synchronism with said collimator in such a manner that the image of detected radiations associated with a particular location on a preselected plane of said subject is moved so as to stop relative motion at said recording medium of the images of radiation sources on said preselected plane whereby during a single scan of the subject a plurality of preferentially resolved readouts of sources on a plurality of preselected planes are obtained.

16. Apparatus as in claim 15 wherein said image forming means is an image detector.

17. Apparatus as in claim 15 wherein said collimator is a focused collimator.

18. Apparatus for producing a readout of the distribution of radiating sources at different depths within the subject on a plurality of preselected planes within said subject during scanning of the subject, collimating means for passing radiation from the subject and for forming intermediate images of at least a portion of the subject, said collimating means being of a type whereby movement of said collimating means causes movement of at least portions of the intermediate images and wherein the rate and direction of image movement is related to the depth of each radiating source within the subject, means for causing relative movement between said collimating means and said subject during said scan and for producing first signals during said scan indicative of the relative positions of said collimating means and said subject, means for detecting said intermediate images and for developing second signals indicative of the existence and location of said intermediate images, means for modifying said second signals and combining them with said first signals to provide an image location for each radiating source in said preselected planes and a computer memory for accumulating the combined signals whereby during a single scan there is produced a plurality of preferentially resolved readouts of radiating sources on said preselected planes.

19. In a method for producing a preferentially resolved readout of the distribution of radiating sources at different depths on at least one preselected plane within a subject by a single scan of the subject, selecting radiation received from the subject by a collimator and forming an intermediate image of at least a portion of the subject, said collimator being of a type whereby movement thereof causes movement of at least portions of the intermediate image and wherein the rate and direction of image movement are related to the depth of each radiating source within the subject, causing relative movement between said collimator and said subject, developing first signals indicative of said relative positions, detecting the intermediate image and providing second signals indicative of the existence and location of said intermediate image, modifying said second signals by using said rate and direction of image movement and combining them with said first signals whereby an image location is developed for each radiating source in said preselected plane and accumulating the combined signals for producing a preferentially resolved readout of sources on said preselected plane.

20. In a method for producing a preferentially resolved readout of the distribution of radiating sources at different depths on at least one preselected plane within a subject by a single scan of the subject, selecting radiation from the subject by a collimator and forming an intermediate image of at least a portion of the subject, said collimator being of a type whereby movement thereof causes movement of at least portions of the intermediate image and wherein the rate and direction of image movement are related to the depth of each radiating source within the subject, causing relative movement between said collimator and said subject, converting said intermediate image into a first output defining the position of said image, effecting relative displacement between said collimator and subject for examining said subject from a plurality of positions to provide a plurality of said first outputs and obtaining from such a displacement second outputs defining said last named positions, and modifying at least one of said first or second outputs using said rate and direction of image movement and combining said outputs as modified to provide a radiation distribution readout having a preferentially resolved readout for radiating sources located on said preselected plane in said subject.

21. In a radiation sensing apparatus for sensing radiation from sources located at different depths in a subject during scanning of the subject, image forming means having a geometrical focal point lying in a focal plane for forming radiation images of the radiation from said sources located at different depths above and below the focal plane, image detecting means for converting said radiation images into first output information defining the position of said images, means for causing relative movement of said image forming means and said subject during said scan and providing second output information on said relative movement, and means for modifying and combining said first and second output information whereby during a single scan there is provided a plurality of preferentially resolved readouts of the distribution of radiation sources in preselected planes.

22. Apparatus as in claim 21 together with recording means and means for supplying said first output information and said second output information to said recording means whereby there is provided a record of the distribution of radiation sources at or near said preselected plane.

23. Apparatus as in claim 21 wherein said image forming means includes a focused collimator.

24. Apparatus as in claim 21 wherein said first output information is in the form of optical images and wherein said image detecting means includes a display device for displaying optical images having positions corresponding with the positions of said radiation images formed by said image forming means.

25. Apparatus as in claim 24 wherein said image detecting means also includes a scintillator for converting the radiation images into additional optical images and means for amplifying said additional optical images and for supplying said amplified information to said display device.

26. Apparatus as in claim 25 together with means for projecting images of said display device which are of different sizes and orientation, a light sensitive medium for receiving said projected images and means for moving said light sensitive medium in response to said second output information whereby there is produced on said light sensitive medium a plurality of images of the distribution of said radiation sources in said subject at or near a plurality of spaced parallel planes.

27. In apparatus for imaging a subject having a three-dimensional distribution of radiation sources therein, a collimator for forming radiation images of the radiation sources located at different depths, radiation detecting means for converting said radiation images into light images, means for causing relative movement in a plane of said collimator and said subject and providing output information in position coordinates of said relative movement, and means utilizing said output information to optically correct said light images to produce sharply resolved images of distribution of said radiation sources located on or near spaced parallel planes parallel to said plane of relative movement.

28. In apparatus for tomographically imaging a three-dimensional distribution of radiation sources in a subject during scanning of the subject, a radiation detector having a radiation sensitive transducer having a two-dimensional radiation detecting capability and output means associated with said transducer operative to produce a first output having information in plane position coordinates of radiation interacting with said transducer, a collimator interposed between said radiation detector and said subject for forming radiation images on said radiation detector, said collimator having a geometrical focal point lying in a focal plane, means for causing movement of said radiation images on said radiation detector during said scan and producing a second output having information in plane position coordinates of said movement, and image display means receiving said first and second outputs whereby there is produced during a single scan a plurality of displayed images of said subject comprising sharply resolved images of the distribution of said radiation sources on or near selected planes in said subject at selected depths and blurred images of the distribution of the radiation sources removed from the selected planes.

29. In apparatus for producing a tomographic image of a subject having a three-dimensional distribution of sources of gamma rays therein, a focused collimator for forming gamma ray images of the gamma rays radiating from said sources, gamma ray image detecting means having an independently positioned output screen displaying each detected gamma ray as a point flash of light, lens means for projecting images of the display means which are of different sizes and orientation, a light sensitive medium for receiving said projected images, and means for causing the collimator and the image detecting means to rectilinearly scan in a plane over the subject and means for moving said light sensitive medium in synchronism with the movement of the collimator and the image detecting means whereby there is produced on said light sensitive medium a plurality of images of the distribution of said radiation sources at or near spaced parallel planes at different distances from said focused collimator.

30. Apparatus as in claim 29 wherein said lens means includes a plurality of lenses and in which each of said lenses produces a sharply resolved image of the distribution of gamma ray sources on or near one of said selected spaced parallel planes and blurred images of the distribution of gamma ray sources remote from said last named plane.

31. In apparatus for producing tomographic images of a subject having a three-dimensional distribution of sources of gamma rays therein, a focused collimator for forming gamma ray images of the gamma rays radiating from said sources, gamma ray image detecting means having an independently positioned output screen displaying each detected gamma ray as a point flash of light, lens means for projecting images of the screen which are of different sizes and orientation, light sensitive medium for receiving said projected images, means for causing relative movement of the collimator with the image detecting means and the subject within a plane, and means for causing relative movement between said light sensitive medium and said lens means in synchronism with the relative movement between said collimator with the image detecting means and said subject whereby there is produced on said light sensitive medium a plurality of images of the distribution of said gamma ray sources in said body.

32. In apparatus for producing a tomographic image of a subject by scanning of the subject having a three-dimensional distribution of sources of gamma rays therein, a focused collimator for forming gamma ray images of the gamma rays radiating from said sources, gamma ray image detecting means for supplying a first electrical output representing position coordinates of each detected gamma ray, means for causing relative movement of the collimator and said subject in a plane during said scan and supplying a second electrical output representing the position coordinates of each detected gamma ray, means for causing relative movement of the collimator and said subject in a plane and supplying a second electrical output representing the position coordinates of said relative movement, computer means for receiving said first and second electrical outputs and for combining the same whereby during a single scan there is provided a plurality of sharply resolved readouts the distribution of gamma ray sources near or at a plurality of spaced parallel planes parallel to the plane of said relative movement during said single scan and blurred readouts of the distribution of gamma ray sources remote from each of the spaced parallel planes.

33. Apparatus as in claim 32 wherein said computer means includes storage means for storing information on the distribution of the gamma ray sources with respect to said spaced parallel planes in which the position coordinates of the storage location of each event are defined as X and Y where $$X = x + knx'$$

and $$Y = y + kny'$$

where $x$ and $y$ are provided by said second electrical output and $x'$ and $y'$ are provided by said first electrical output and where k and n are constants whose values determine the distance of the geometrical focal plane of the focused collimator to the selected planes.

34. In a multiplane tomographic scanner for simultaneously obtaining a plurality of images of radioactivity, each image being focused at a differing plane in a subject, the combination comprising:
   a radiation image detector of the class having an output representing points at which radiation is detected in a radiation sensitive material in said detector,
   an image converging collimating means affixed to said radiation image detector to limit the response of said detector to specific regions of said subject,
   means creating a relative scanning motion between said subject with respect to said collimating means,
   means measuring the coordinate position of said radiation detector with respect to said subject,
   means for changing the magnitude of said output from said radiation detector by at least two differing factors to obtain at least two differing sets of adjusted outputs for said radiation detected in said radiation image detector,
   means for adding the coordinate position of said radiation detector to each of said sets of adjusted outputs to obtain plane related combinations of data, and
   means constructing separate images from each said set of data.

35. In a multiplane tomographic scanner for simultaneously obtaining a plurality of images of radioactivity with each image focused at differing planes in a subject, the combination comprising:
   a radiation image detector of the class having output signals representing the coordinates of points at which radiation from a subject is detected in a radiation sensitive material in said detector,
   a converging collimating means affixed to said radiation detector to limit the response of said radiation sensitive material to specific regions of said subject,
   means creating a relative scanning motion between said focusing means and said detector with respect to said subject,
   display means receiving said output signals from said detector and producing an image at a position spatially related to points at which radiation is intercepted by said radiation sensitive material,
   a photographic film,
   means moving said film with respect to said display means in coordination with said scanning motion of said detector, and
   a plurality of optical means disposed between said display means and said film, said optical means projecting differently sized images of said display means on said film.

36. An apparatus for obtaining radiation distribution readouts of radiating sources located at different depths in a subject, said apparatus comprising a collimator for producing radiation images of said sources wherein the relative positions of the images of the sources on different planes within said subject will vary with the relative positions between said collimator and said subject, second means converting said radiation images into optical images displayed on a screen and having positions on said screen corresponding with the positions of said radiation images, means effecting relative displacement between said collimator and said subject for examining said subject from a plurality of relative positions, a light sensitive medium receiving said optical images, a plurality of lenses projecting onto said medium different size images of said screen to provide a plurality of radiation distribution readouts, each lens of said plurality of lenses being focused on a different plane at different depths in said subject, and means providing relative positions of said screen with respect to said medium corresponding with the relative positions of said collimator with respect to said subject.

37. An apparatus as defined in claim 36 together with means inverting at least one of the projected images of said screen.

38. An apparatus as defined in claim 36 wherein each of said lenses projects images of said screen onto a separate portion of said medium.

39. An apparatus as defined in claim 38 wherein said collimator is a focused collimator and the size of each projected image of said screen has a size D according to the relationship $$D = \frac{2S'}{S}(f-b) \tan \frac{a}{2}$$

where
   $S'$ = rate of relative displacement of said projected image with respect to said recording medium,
   $S$ = rate of relative displacement of said collimator with respect to the subject,
   $f$ = distance between said collimator and the focal plane thereof,
   $b$ = distance from said collimator to a preselected plane in the subject, and
   $a$ = acceptance angle of said collimator.

40. An apparatus for obtaining a radiation distribution readout of radiation sources located at different depths in a subject, said apparatus comprising radiation image forming first means for producing images of said sources wherein the relative positions of the images of sources on different planes within said subject will vary with changes in the relative position of said first means and said subject, image detecting second means converting said images and producing a plurality of first outputs giving information as to the positions of said images, third means for changing the relative positions of said first means and said subject for examining said subject from a plurality of relative positions, said third means including means for providing a plurality of second outputs having information as to said relative positions, image deriving fourth means for modifying at least one of said first and second outputs and for combining said first and second outputs as modified to provide a readout of said radiation sources having a preferential focusing effect for those sources located on a selected plane in the subject, said image deriving fourth means including computer means.

41. An apparatus as defined in claim 40 wherein said image deriving fourth means includes means for recording and displaying said readout.

42. An apparatus as defined in claim 40 wherein said image deriving fourth means changes the magnitude and polarity of at least one of said first and second outputs by at least two different factors to obtain at least two different sets of adjusted outputs individually combined with the other of said first and second outputs to obtain at least two readouts, each readout being focused on a different plane in the subject.

43. In apparatus for producing a preferentially resolved readout of the distribution of radiation source on a preselected plane within a subject, collimating means for passing radiation from the subject and for forming an intermediate image of at least a portion of the subject, said collimating means being of a type whereby movement of said collimating means causes movement of at least portions of the intermediate image and wherein the rate of image movement is related to the depth of each radiation source within the subject, means for changing the relative positions of said collimating means and said subject and for developing a first set of coordinate signals indicative of said relative positions, means for detecting said intermediate images and for developing a second set of coordinate signals indicative of the existence and location of said intermediate image, and means for modifying said second set of coordinate signals and for combining them with said first set of coordinate signals for producing a preferentially resolved readout of sources on said preselected plane.

44. In apparatus for producing a preferentially resolved readout of the distribution of radiation sources on a preselected plane within a subject, collimating means for passing radiation from the subject and for forming an intermediate image of at least a portion of the subject, said collimating means being of a type whereby movement of said collimating means causes movement of at least portions of the intermediate image and wherein the rate of image movement is related to the depth of each radiation source within the subject, means for changing the relative positions of said collimating means and said subject and for developing first signals indicative of said relative positions, means for detecting said intermediate images and for developing second signals indicative of the existence and location of said intermediate image, means for modifying said second signals and combining them with said first signals for producing a plurality of readouts of the distribution of radiation source from a plurality of preselected planes.

45. An apparatus for producing readouts of the distribution of radiation sources located at different depths within a subject by a single scan of the subject, a collimator that forms an image of at least a portion of said subject, said collimator being of a kind whereby relative movement between the collimator and the subject causes movement of at least portions of said image, image forming means including a plurality of lenses coupled to the output of said collimator for converting radiation passed by said collimator into a plurality of light flashes and including a screen for displaying said light flashes in substantially the same relative location as said detected radiations at said collimator output, means for causing relative movement between said collimator and said subject to cause scanning of successive regions of said subject, a light recording medium, means for causing relative movement between the lenses and the light recording medium in synchronism with said collimator in such a manner that images of detected radiations associated with particular locations on the plurality of preselected planes of said subject are moved so as to stop relative motion at said recording medium of the images of radiation sources on said preselected planes to thereby give preferentially resolved readouts for each of a plurality of preselected planes during a single scan of said collimator.

46. Apparatus as defined in claim 45 wherein said lenses project different size images of said screen onto separate portions of said medium, each portion recording a readout focused on a different plane in said subject.

47. Apparatus as in claim 45 wherein said collimator is a focused collimator having a geometric focal point lying in a focal plane between certain of said preselected planes and wherein said image forming means includes means for inverting the images corresponding to preselected planes on one side of the focal plane with respect to the other.

48. Apparatus as defined in claim 45 wherein said collimator is a focused collimator and the size of each projected image of said screen has a size D according to the relationship $$D = \frac{2S'}{S}(f-b) \tan \frac{a}{2}$$

where
 $S'$ = rate of relative displacement of said projected image with respect to said recording medium,
 $S$ = rate of relative displacement of said collimator with respect to the subject,
 $f$ = distance between said collimator and the focal plane thereof,
 $b$ = distance from said collimator to a preselected plane in the subject, and
 $a$ = acceptance angle of said collimator.

49. Apparatus for producing a readout of the distribution of radiation sources on a preselected plane within a subject, collimating means for passing radiation from said radiating sources in said subject and for forming an intermediate image of at least a portion of the subject, said collimating means being of a type whereby movement of said collimating means causes movement of at least portions of the intermediate image and wherein the rate of movement is related to the depth of each radiating source within the subject, means for causing relative movement between said collimating means and said subject and for producing first signals defined as (x,y) indicative of the relative positions of said collimating means and said subject, means for detecting said intermediate image and for developing second signals defined as (x',y') indicative of the existence and location of said intermediate image, means for modifying said second signals and combining them with said first signals to provide an image location for each radiation source in said preselected plane, said modifying and combining means operating on said first and second signals to produce transform signals (X,Y) in accordance with $$X = x + knx'$$

where $$Y = y + kny'$$

$k$ and $n$ are constants whose values relate to the distance between the collimator and the preselected plane and a computer memory for accumulating the combined signals and for producing a preferentially resolved readout of radiating sources on said preselected plane.

50. Apparatus as in claim 49 wherein said modifying means and said computer memory provide preferentially resolved readouts of more than one preselected plane.

51. In a method for producing a preferentially resolved readout of the distribution of radiation sources at different depths on at least one preselected plane within a subject, selecting radiation from the subject by a collimator and forming an intermediate image of at least a portion of the subject, said collimator being of a type whereby movement thereof causes movement of at least portions of the intermediate image and wherein the rate of image movement is related to the depth of each radiating source within the subject, causing relative movement between said collimator and said subject, converting said intermediate image into a first output defining the position of said image, effective relative displacement between said collimator and said subject for examining said subject from a plurality of positions to provide a plurality of said first outputs and obtaining from such a displacement second outputs defining said last named positions, modifying at least one of said first and second outputs and combining said outputs as modified to provide a radiation distribution readout, said step of modifying and combining including converting said radiation images into optical images displayed on a screen and having positions on said screen corresponding with the positions of said radiation sources in said subject, projecting an image of said screen with said optical images thereon onto a light sensitive medium and effecting relative displacement of said medium with respect to the projected image of said screen corresponding with the displacement between said collimator and said subject to provide a preferentially resolved readout for radiation source located on said preselected plane in said subject.

52. A method as defined in claim 51 wherein intermediate images are provided from a plurality of said preselected planes within said subject and causing optical images of different sizes to be displayed on said screen related to the depth of the radiation sources in said subject and projecting said images of different sizes onto said medium to provide a plurality of radiation distribution readouts, each portion of said medium recording a readout preferentially resolved on a different plane of said subject.

53. In apparatus for producing a radiation distribution readout of a subject having a three-dimensional distribution of gamma ray sources therein, during scanning of the subject, a collimator for forming gamma ray images of the gamma rays radiating from said sources, said collimator having a geometrical focal point lying in a focal plane, means for causing relative movement of said collimator and said subject during said scan of the subject, said collimator being of a type wherein the relative positions of images of the gamma ray sources at different depths in the subject varies with the relative positions between the collimator and the subject, gamma ray image detecting means for producing a first electrical output representing position coordinates of each detected gamma ray during said scan, means for producing a second electrical output representing the position of said collimator relative to said subject during said scan and computer means for receiving said first and second electrical outputs and for combining the same whereby during a single scan there is provided a plurality of radiation distribution readouts in which gamma ray sources on or near chosen planes are sharply resolved while gamma ray sources remote from the chosen plane are blurred.

* * * * *

UNITED STATES PATENT OFFICE
CERTIFICATE OF CORRECTION

Patent No. 3,979,594  Dated September 7, 1976

Inventor(s) Hal O. Anger

It is certified that error appears in the above-identified patent and that said Letters Patent are hereby corrected as shown below:

On the Title Page, Item [73] should read:

---The Regents of the University of California---

Signed and Sealed this

Seventh Day of June 1977

[SEAL]

Attest:

RUTH C. MASON
*Attesting Officer*

C. MARSHALL DANN
*Commissioner of Patents and Trademarks*